United States Patent [19]

Pritchard

[11] 4,067,582
[45] Jan. 10, 1978

[54] STYLUS SUSPENSION

[75] Inventor: Peter E. Pritchard, New Milford, Conn.

[73] Assignee: Sonic Research, Inc., Danbury, Conn.

[21] Appl. No.: 701,365

[22] Filed: June 30, 1976

Related U.S. Application Data

[63] Continuation-in-part of Ser. No. 611,214, Sept. 8, 1975, Pat. No. 4,009,885.

[51] Int. Cl.² .................. G11B 3/02; H04R 1/16; H04R 11/08
[52] U.S. Cl. .................. 274/37; 179/100.41 K; 179/100.41 Z
[58] Field of Search .................. 274/37, 38; 179/100.41 K, 100.41 M, 100.41 Z

[56] References Cited

U.S. PATENT DOCUMENTS

| 3,904,837 | 9/1975 | Sugimoto | 179/100.41 K |
| 3,908,096 | 9/1975 | Furuya | 179/100.41 K |

Primary Examiner—Steven L. Stephan
Attorney, Agent, or Firm—James J. Burke

[57] ABSTRACT

A stylus suspension for a phonograph pick-up cartridge. A first improvement includes an asymmetrically mounted ring and washer clamping the suspension block in a manner that dampens vertical compliance of the suspension. A further improvement includes a suspension block specifically adapted to accommodate the ring, thus more particularly defining the pivot point. In this instance the ring may be mounted symmetrically or as in the first improvement. A still further improvement includes an armature of reduced mass that, surprisingly, does not result in lessened performance.

12 Claims, 2 Drawing Figures

STYLUS SUSPENSION

RELATED APPLICATIONS

This application is a continuation-in-part of U.S. application Ser. No. 611,214 filed Sept. 8, 1975, now U.S. Pat. No. 4,009,885, issued Mar. 1, 1977.

FIELD OF THE INVENTION

The present invention relates generally to phonograph pick-up cartridges, and, more particularly, it relates to the suspension of the stylus assembly therein and, in one aspect, the stylus assembly itself.

A stylus assembly in modern, electromagnetic pick-up cartidges generally comprises a cantilever tube flattened at one end to accommodate a diamond stylus, and an armature tube of a magnetic material, to which the cantilever is attached. The armature may be a permanent magnet, or it may be a magnetizable alloy charged by a separate magnet. The armature is supported in a rubber suspension block which establishes a pivot point for the assembly. A wire connected to the armature near the pivot point may provide a restoring force. The stylus moves in the recording groove and the free end of the armature describes a mirror-image of that motion between the pole pieces of the two magnetic circuits creating a signal for each channel of the recording.

There are several criteria for a successful stylus suspension system: transverse motion must be perfectly symmetrical, the pivot point must be fixed and not "wander", frictional and elastic moments must be controlled, torsional and axial movement, along with resonances, must be suppressed, and vertical movement should be damped. Additionally, of course, are considerations of achieving uniform quality without excessive cost.

In the above-noted co-pending application there is described a suspension block having inwardly tapering sidewalls and a square, central aperture. The armature includes a section having a corresponding square outside configuration of smaller overall dimensions than the remainder of the armature, so that the stylus assembly may be literally snapped into place, vertical alignment is assured, and torsional movement is effectively suppressed.

The present invention provides further improvements in such a stylus suspension.

OBJECTS OF THE INVENTION

A general object of the present invention is to provide an improved stylus assembly and suspension.

Another object of the present invention is to provide a stylus assembly of reduced mass.

A still further object of the present invention is to provide a stylus suspension with a more fixed pivot point.

Yet another object of the present invention is to provide a stylus suspension that may be adjusted to compensate for minute variations in the suspension block.

Various other objects and advantages of the invention will become clear from the following description of embodiments thereof, and the novel features will be particularly pointed out in connection with the appended claims.

THE DRAWINGS

Reference will hereinafter be made to the accompanying drawings, wherein:

FIG. 1 is a cross-sectional elevation view of one embodiment of the invention; and FIG. 2 is a cross-sectional elevation of a second embodiment of the invention.

DESCRIPTION OF EMBODIMENTS

The present invention is based, in one aspect, on the discovery that damping and stiffness of the stylus assembly are improved by clamping the suspension block with a ring asymmetrically. More particularly, the clamping ring will be generally in a plane normal to the center-line axis of the stylus assembly, but is tilted about 5° from that plane to more tightly clamp the suspension block on the side parallel to the stylus tip.

In another aspect the invention is based on the use of a suspension block having an annular shoulder to accommodate the above-noted clamping ring. This more precisely defines the pivot point of the stylus assembly. In this embodiment, the ring may be asymmetrically mounted, with the above-noted improvement in damping properties, but this is not essential.

In still another aspect, the invention is based on the discovery that the free end of the armature, e.g. the end moving between the pole pieces, can be tapered or reamed, with a consequent reduction in mass, without impairing the response of the cartridge.

Figure 1:
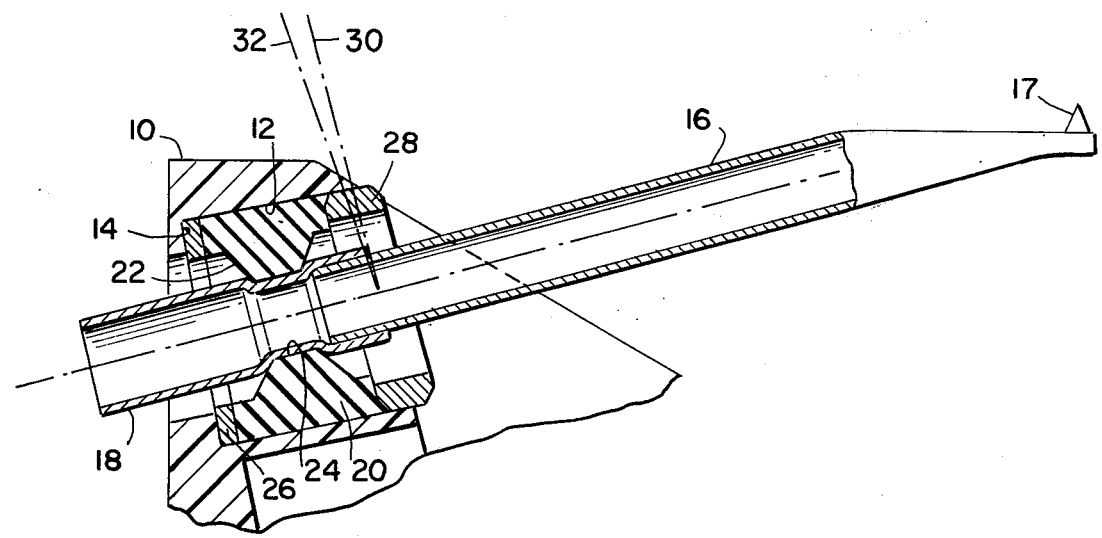

Understanding of the invention will be facilitated by referring to FIG. 1. A housing 10, generally a molded plastic, includes an aperture 12 including an inwardly extending shoulder 14 in which the stylus suspension is mounted. The stylus assembly includes a cantilever 16, generally an aluminum tube, with the diamond stylus 17 at the distal end thereof, and an armature 18, also tubular, made of a suitable magnetic alloy, generally a nickel alloy. The suspension block 20 secures the stylus assembly within aperture 12. As shown, suspension block 20 has inwardly tapered sidewalls 22 terminating in an axial, square opening 24 into which a corresponding square portion of the armature is snap-fit. This arrangement, which is disclosed in the above-noted co-pending application, is preferred but, as will become apparent, is not an essential part of the present invention.

It is also preferred that a washer 26 be seated against shoulder 14, and that suspension block 20 be seated against it but, again, this is not essential. Washer 26 inhibits longitudinal motion of block 20 and provides a seating therefor.

What is essential to the FIG. 1 embodiment is the use of clamping ring 28, which asymmetrically clamps block 20 against washer 26 and, more importantly, around armature 18. Thus, while ring 28 lies generally in a plane 30 normal to the centerline axis of the stylus assembly, it is in fact tilted about 5° (see plane 32) to more tightly clamp block 20 on the same side of the stylus assembly as stylus 17 (e.g. above the centerline axis in FIG. 1).

It has been determined that this dampens vertical motion of the stylus a small but significant amount, and increases the "stiffness" in a similar fashion. Damping of vertical motion is important in operation, because all signal motions generated by the record groove are 45° from vertical. The clamp ring 28 is mounted on a mandrel in proper juxtaposition with the housing 10, which is held in a suitable jig. By pressing ring 28 against block 20 with a predetermined force, the suspension properties of the completed system are found to be remarkably uniform, even though there might be minute defects (air bubbles, dimensional inaccuracies, etc.) in block 20. Or, if a given unit is found to be out of specification with respect to compliance, the ring 28 can be adjusted. It is noted that the plastic of housing 10 is sufficiently compliant to accept ring 28 at the prescribed angle.

Figure 2:
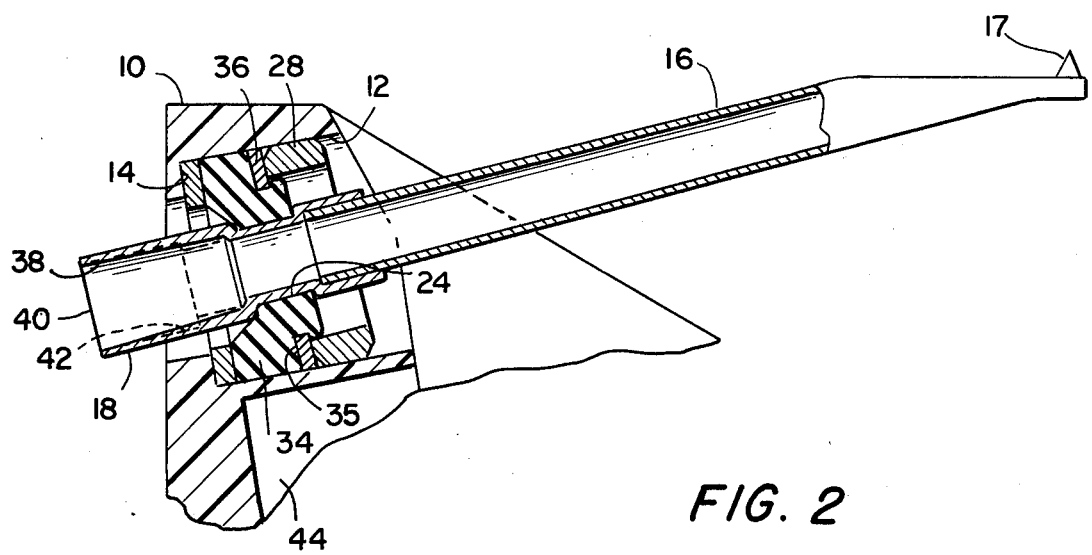

Further improvements in the suspension system are illustrated in FIG. 2. In this embodiment, a modified suspension block 34 is provided with an annular shoulder 35 specifically adapted to receive clamping ring 28. A second washer 36 is provided between ring 28 and block 34, and its size and fit are important to the invention. More particularly, as can be seen in FIG. 2, washer 36 has a smaller inner diameter than ring 28, and pivot block 34 bulges slightly around the inner edge of washer 36; the latter thus pre-tensions the block and provides a dynamic spring effect with the block being the resistive element. With this combination, it is thus possible to control damping and compliance independently to a substantial degree. This combination also provides a more sharply defined pivot point for the armature, the tensioning of block 34 acting to suppress axial movement. It will be appreciated that washer 36 and ring 28 could be a single piece, and the improvements brought about by the washer obtain whether or not the ring is asymmetrically mounted.

FIG. 2 illustrates an armature 18 of reduced mass due to the interior surface 38 being tapered so as to have a thinner cross-section at the free end 40. Alternatively, the inner surface may be merely bored or reamed out, as shown in phantom at 42.

It was initially thought that, by reducing the mass of armature 18 at its "working" end 40, e.g. the end that moves between the pole pieces, the cartridge output would be significantly reduced. In practice, this turned out not to be the case; while not wishing to be bound to a particular theory, it is believed that the thinner cross-section at end surface 40 merely concentrates the magnetic flux lines over a smaller area without diminishing the total magnetic flux that, through the coils, generates the output signals. Of coure, as those skilled in the art appreciate, any reduction in the mass of the "moving system", i.e., the stylus assembly, will have beneficial consequences.

A still further improvement in operation is brought about by fabricating ring 28 of permanent magnet material that is oriented (poled) so as to interface with the magnetic flux field created by the main charging magnet, 44 in FIG. 2. It is believed that this arrangement distorts the flux field of magnet 44 in a way that concentrates more flux in the free end 40 of armature 18. At the same time, the opposing field of magnet-ring 28 balances any magnetic moments that the distorted flux might create. The flux concentration at the free end of armature 18 produces a small but significant increase in output.

Various changes in the details, steps, materials and arrangements of parts, which have been herein described and illustrated in order to explain the nature of the invention may be made by those skilled in the art within the principle and scope of the invention as defined in the appended claims.

What is claimed is:

1. A stylus suspension for a phonograph pick-up cartridge comprising:
   a plastic housing having an aperture;
   a resilient suspension block retained against the inside wall of said aperture, and having a central, axial opening;
   a stylus assembly comprising a stylus cantilever tube having a stylus at its distal end and attached to an armature tube at its opposed end, said armature tube being secured within said axial opening in said suspension block; and
   a separate clamping ring frictionally retained against the inside wall of said aperture and compressing said suspension block within said aperture, said plastic housing being sufficiently compliant to accept said ring.

2. The stylus suspension as claimed in claim 1, wherein said clamping ring asymmetrically clamps said suspension block in a manner adapted to dampen vertical motion of said stylus.

3. The stylus suspension as claimed in claim 2, wherein said clamping ring tilts into said aperture about 5° further from the plane normal to the axis of said stylus assembly on the side of said stylus.

4. The stylus suspension as claimed in claim 1, wherein said suspension block includes an annular shoulder adapted to accommodate said clamping ring.

5. The stylus suspension as claimed in claim 4, and additionally comprising a washer between said suspension block and said clamping ring, said washer having a smaller inner diameter than said ring and thereby pre-tensioning said pivot block.

6. The stylus suspension as claimed in claim 1, wherein the end of said armature tube opposed to said stylus tube is of reduced cross-section.

7. The stylus suspension as claimed in claim 1, wherein said suspension block is retained in said aperture against an inwardly-extending annular shoulder in said housing, and additionally comprising a washer between said shoulder and said suspension block.

8. The stylus suspension as claimed in claim 1, wherein said clamping ring is a permanent magnet.

9. A stylus assembly for a phonograph pick-up cartridge comprising:
   a non-magnetic cantilever tube and a magnetic armature tube, said tubes joined at their inner ends;
   a stylus at the outer end of said cantilever tube;
   suspension means on said armature tube;
   the outer end portion of said armature tube having a reduced wall thickness, thereby reducing the mass of said armature.

10. A stylus suspension for a phonograph pick-up cartridge comprising:
    a plastic housing having an aperture;
    a resilient suspension block retained against the inside wall of said aperture, and having a central, axial opening;
    a stylus assembly comprising a stylus cantilever tube having a stylus at its distal end and attached to an armature tube at its opposed end, said armature tube being secured within said axial opening in said suspension block;
    a separate clamping ring frictionally retained against the inside wall of said aperture and compressing said suspension block within an aperture, said plastic housing being sufficiently compliant to accept said ring;
    said clamping ring asymmetrically clamping said suspension block in a manner adapted to dampen vertical motion of said stylus; and
    said armature having a reduced cross-sectional thickness at the end portion thereof opposed to said cantilever tube.

11. A stylus suspension for a phonograph pick-up cartridge comprising:
- a plastic housing having a round aperture therethrough and an inwardly-extending annular shoulder at one end;
- a first washer seated in said aperture against the inside wall of said aperture and seated against said first washer, and having a central, axial square opening and an annular shoulder on the side opposed to said first washer;
- a stylus assembly comprising a stylus cantilever tube having a stylus at its distal end and attached to an armature tube at its opposed end, said armature tube including a portion of square outside cross-section secured in said square opening;
- a second washer in said aperture seated against said shoulder in said suspension block and having an inner diameter sized to pre-tension said suspension block;
- a separate clamping ring frictionally retained against the inside wall of said aperture and seated against said second washer, said ring compressing said suspension block, and said plastic housing being sufficiently compliant to accept said ring.

12. The stylus suspension as claimed in claim 11, wherein said second washer and said ring comprise an integral unit, the washer portion thereof having a smaller inner diameter than the ring portion thereof.

* * * * *

UNITED STATES PATENT AND TRADEMARK OFFICE
CERTIFICATE OF CORRECTION

PATENT NO. : 4,067,582
DATED : January 10, 1978
INVENTOR(S) : Peter E. Pritchard It is certified that error appears in the above-identified patent and that said Letters Patent are hereby corrected as shown below:

Column 5 lines 7 to 12: delete lines 7 to 12 and insert the following:

-- a first washer seated in said aperture against said shoulder;

a resilient suspension block retained against the inside wall of said aperture and seated against said first washer, and having a central, axial square opening and an annular shoulder on the side opposed to said first washer; --

Signed and Sealed this

Eleventh Day of April 1978

[SEAL]

Attest:

RUTH C. MASON
*Attesting Officer*

LUTRELLE F. PARKER
*Acting Commissioner of Patents and Trademarks*